United States Patent
Kaesser

(10) Patent No.: US 6,697,648 B1
(45) Date of Patent: Feb. 24, 2004

(54) RADIO COMMUNICATION BOOSTER FOR PORTABLE RADIO TRANSCEIVERS

(75) Inventor: Juergen Kaesser, Diekholzen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/367,203

(22) PCT Filed: Jan. 26, 1998

(86) PCT No.: PCT/DE98/00224
§ 371 (c)(1),
(2), (4) Date: Aug. 9, 1999

(87) PCT Pub. No.: WO98/36503
PCT Pub. Date: Aug. 20, 1998

(30) Foreign Application Priority Data

Feb. 13, 1997 (DE) .......................................... 197 05 447

(51) Int. Cl.[7] ................................................. H04B 1/38
(52) U.S. Cl. ................ 455/571; 455/550.1; 455/127.1; 455/73; 455/127.3
(58) Field of Search .......................... 455/91, 127, 116, 455/123, 126, 129, 571, 550, 550.1, 73, 127.1, 127.3; 330/2, 279, 151, 285

(56) References Cited

U.S. PATENT DOCUMENTS

| 4,636,741 A | * | 1/1987 | Mitzlaff | 330/127 |
| 5,146,614 A | * | 9/1992 | Furuno | 455/127 |
| 5,220,290 A | * | 6/1993 | Black | 455/116 |
| 5,303,395 A | | 4/1994 | Dayani | |
| 5,511,239 A | * | 4/1996 | Dennerlein et al. | 455/126 |
| 5,623,227 A | * | 4/1997 | Everline et al. | 330/2 |
| 5,789,984 A | * | 8/1998 | Davis et al. | 330/279 |
| 5,832,374 A | * | 11/1998 | Birth et al. | 455/115 |
| 6,208,846 B1 | * | 3/2001 | Chen et al. | 455/127 |
| 6,229,995 B1 | * | 5/2001 | Lee | 455/127 |
| 6,230,031 B1 | * | 5/2001 | Barber | 455/571 |

FOREIGN PATENT DOCUMENTS

EP 0 602 608 A 6/1994

OTHER PUBLICATIONS

"European Digital Cellular Telecommunications System (Phase 2); Radio Transmission and Reception (GSM 05.05)", Euroepan Telecommunication Standard, May 1994.

* cited by examiner

Primary Examiner—Sonny Trinh
(74) Attorney, Agent, or Firm—Michael J. Striker

(57) ABSTRACT

A radio apparatus (1), in particular for mobile radio, of a first predetermined power stage is proposed, whose broadcasting power can be increased by connecting a HF amplifier circuit. The radio apparatus (1) has an antenna output (5), to which an input (10) of a HF amplifier circuit (15) can be connected, for operating the radio apparatus (1) at a higher, second power stage. As a function of the HF amplifier circuit (15) connected to the radio apparatus (1), a transmitter unit (20) of the radio apparatus (1) outputs signals for transmission to a radio network, which signals contain the information about operation at the applicable power stage.

9 Claims, 2 Drawing Sheets

RADIO COMMUNICATION BOOSTER FOR PORTABLE RADIO TRANSCEIVERS

BACKGROUND OF THE INVENTION

The present invention relates generally to a radio apparatus.

PRIOR ART

The invention is based on a radio apparatus as generically defined by the preamble to the main claim.

From the publication entitled "European Digital Cellular Telecommunications System (Phase 2); Radio Transmission and Reception (GSM 05.05)" of the European Telecommunications Standard Institute (ETSI) of May 1994, specifications for mobile radio transmission and reception are known. A plurality of power stages are provided, such as a power stage 2 with a maximum output power of 8 W and a power stage 4 with a maximum power of 2 W. The power requirements made of the mobile radio apparatuses pertain to the antenna output of the applicable mobile radio apparatus.

From U.S. Pat. No. 5,303,395, a system for controlling the power stage of high-frequency (HF) signals that are output by a portable radio apparatus is known. The portable radio apparatus includes a first power supply, a first amplifier stage, and a microcomputer that is connected to the first amplifier stage in order to select from a plurality of power stages. An indicator signals when the radio apparatus is connected to a motor vehicle power supply. In response, the microcomputer generates a control signal, which is representative for the desired power stage. A second amplifier stage is connected to the first amplifier stage and receives HF signals that are at the first power stage. An amplifier control circuit is connected to the second amplifier stage and receives the control signal. It responds by setting the gain of the second amplifier stage to one of at least two constant gain values, so that the HF signals output at the desired power stages are made available.

From European Patent Disclosure EP 0 602 608 A1 a mobile radio apparatus is known that comprises a portable unit and a stationary part and that is provided for control between two apparatuses, each with its own control unit. By way of the control unit, a transmission power regulation is performed in the booster, and the booster is turned on and off from the portable apparatus. In the opposite direction, the portable apparatus receives information as to the presence or absence of a booster. The control signals needed in the booster are limited to two, namely the signal for switching over the amplification and the signal for turning all the power consumers on and off, except for the circuit that has to assure the control function between the booster and the hand-held apparatus in the standby mode.

ADVANTAGES OF THE INVENTION

The radio apparatus of the invention has the advantage over the prior art that the radio apparatus can be operated at various power stages and can thus be used flexibly. A further advantage is that an inexpensive radio apparatus with a lower power stage can easily be equipped for operation at a higher power stage by means of a connectable HF amplifier circuit. Thus using the appropriate accessory equipment, a single radio apparatus can be used for various power stages, making for an overall cost saving since only the applicable HF amplifier circuit has to be produced or purchased as an accessory, and not a complete new radio apparatus.

It is also advantageous that the range of a radio apparatus.

By means of the provisions recited in the dependent claims, advantageous refinements of and improvements to the radio apparatus defined by the main claim are possible.

It is especially advantageous to use an evaluation circuit and to detect a HF amplifier circuit connected to the radio apparatus by means of the evaluation circuit. This provides a simple opportunity of ascertaining the current power stage of the radio apparatus.

It is also advantageous that the radio apparatus has an input to which one output of the HF amplifier circuit can be connected; that the evaluation circuit is connected to the input; and that the evaluation circuit triggers the transmitter unit of the radio apparatus as a function of signals or the voltage drop at the input. In this way, a HF amplifier circuit connected to the radio apparatus can be detected especially simply and reliably, and the radio apparatus can be logged in in a simple way in accordance with its current power stage in the radio network. It is especially advantageous that the evaluation circuit is connected to the antenna output, and if the evaluation circuit triggers the transmitter unit of the radio apparatus as a function of signals or of the voltage drop at the antenna output. This affords an especially simple and reliable opportunity of detecting the connection of a corresponding HF amplifier circuit to the radio apparatus and to have the radio apparatus logged in in accordance with its current power stage in the radio network; no additional connecting line between the radio apparatus and the HF amplifier circuit is needed for detecting the connection of the HF amplifier circuit to the radio apparatus.

BRIEF DESCRIPTION OF THE DRAWINGS

Exemplary embodiments of the invention are shown in the drawing and described in further detail in the ensuing.

DESCRIPTION OF THE PREFERRED EMBODIMENT

Figure 1:
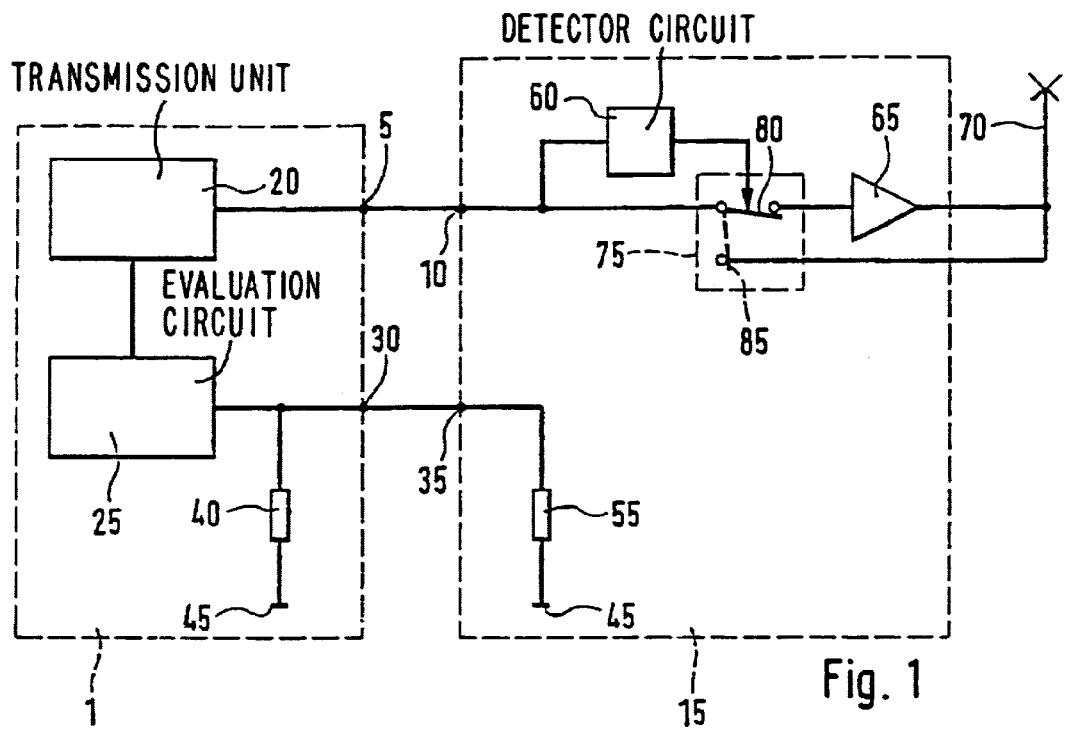
FIG. 1 shows a block circuit diagram of a radio apparatus of the invention with a HF amplifier circuit connected to it, in a first embodiment.

In FIG. 1, reference numeral 1 designates a radio apparatus, embodied as a mobile telephone, with a transmission unit 20 that also includes a reception unit and will therefore hereinafter be called a transceiver unit 20, and with an evaluation circuit 25 that is connected to the transceiver unit. 20. The transceiver unit 20 is connected to an antenna output 5 of the mobile phone 1, and the evaluation circuit 25 is connected to one input 30 of the mobile phone 1. The mobile phone 1 also has a first resistor 40, by way of which the input 30 is connected to a reference potential 45. A HF amplifier circuit 15, which has an input 10 connected to the antenna output 5, is connected to the mobile phone 1. An output 35 of the HF amplifier circuit 15, connected to the input 30, is likewise connected to the reference potential 45, via a second resistor 55 of the HF amplifier circuit 15. On the one hand, in a first switch position 80, the input 10 can be connected via a switch 75 to the input of an amplifier 65, whose output is connected to a transmission/reception antenna 70; on the other hand, in a second switch position 85, the input 10 can be connected directly to the transmission/reception antenna 70. Also connected to the input 10 is a detector circuit 60, which triggers the switch 75.

The mobile phone is operated, for instance in accordance with the publication "European Digital Cellular Telecommunications System (Phase 2); Radio Transmission and Reception (GSM 05.05)" of the European Telecommunications Standard Institute (ETSI) of May 1994, at a power stage 4 with a maximum output power of 2 W. By means of the HF amplifier circuit 15, however, as a function of the gain of the amplifier 65, operation of the mobile phone 1 at a higher power stage, such as the power stage 3 with a maximum output power of 5 W or the power stage 2 with a maximum output power of 8 W is possible. However, that requires that the mobile phone 1 from the outset meet the specifications of the aforementioned GSM standard 05.05 that are provided for the higher power stages. For instance, the mobile phone 1 has the higher intermodulation strength of −43 dBm, which are prescribed for the power stage 2, instead of −49 dBm for the power stage 4, and a higher sensitivity of −104 dBm, instead of −102 dBm, in the reception part of the transceiver unit 20.

Figure 3:
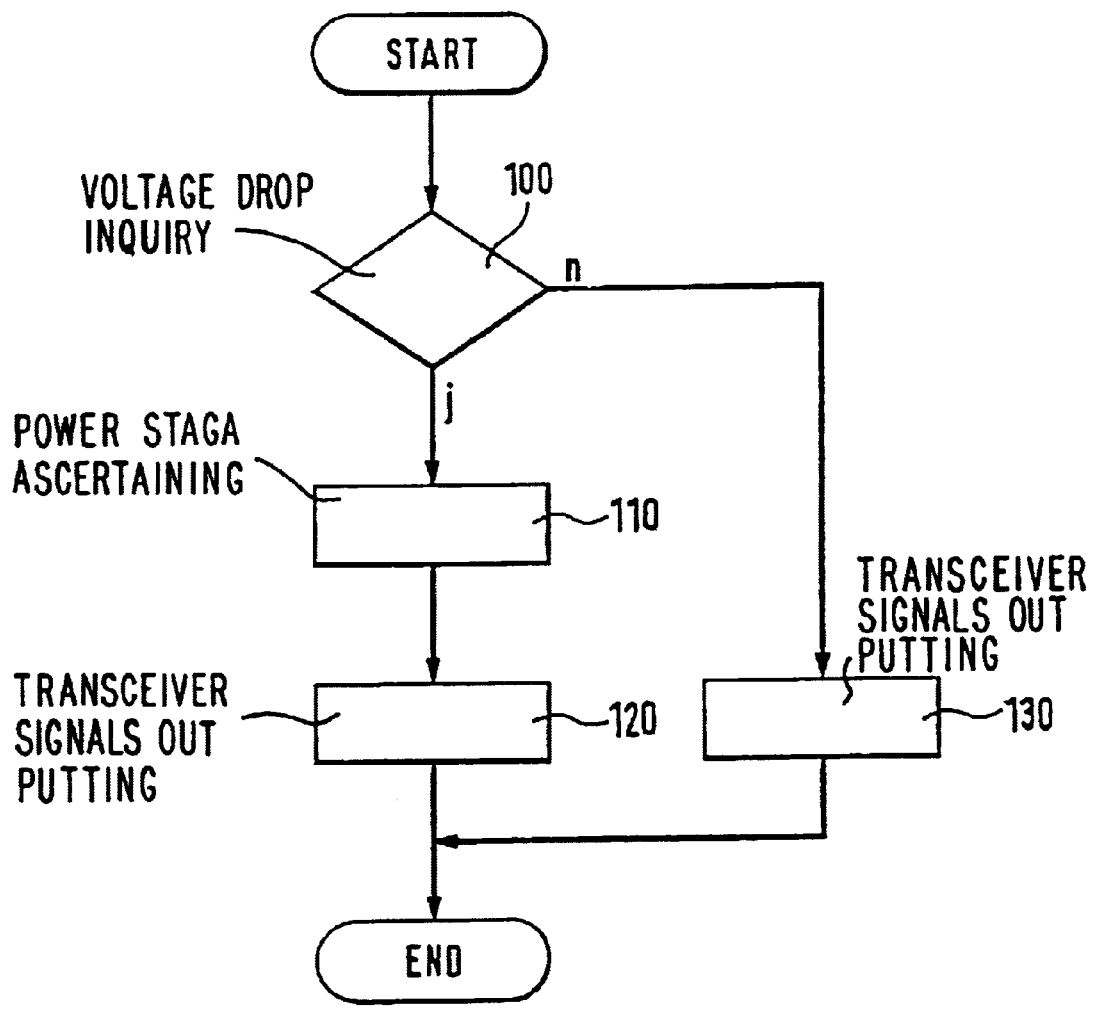
FIG. 3, a flow chart for an evaluation circuit of a radio apparatus of the invention.

In FIG. 3, a flow chart for the operation of the evaluation circuit 25 is provided. Before a telephone call is made, the mobile phone 1 must report its power stage to a base station in the mobile radio network, so that the delay times required for synchronous data transmission can be established in accordance with the range of the mobile phone 1, which is dependent on its power stage. Thus before a connection is made, the evaluation circuit 25 at program point 100 makes an inquiry about the voltage drop at the input 30. If the voltage drop at the input is not maximal, then a jump to program point 110 is made, and otherwise a jump is made to program point 130. At program point 110, from the measured voltage drop, the power stage of the mobile phone 1, supplemented with the HF amplifier circuit 15, is ascertained. The second resistor 55 is set as a function of the gain of the amplifier 65, so that from the power stage of the mobile phone 1 and the voltage drop at the input 30, the evaluation circuit 25 can ascertain the power stage of the mobile phone 1 expanded by the HF amplifier circuit 15. At program point 120, the transceiver unit 20, by means of a suitable control signal of the evaluation circuit 25, is activated to output signals to the transmission/reception antenna 70 for transmission to a base station of the radio network, which signals contain information about operation at the ascertained power stage. The evaluation circuit 25 thus triggers the transceiver unit 20 of the mobile phone 1 as a function of the voltage drop at the antenna output 5. Next, a departure from the program is made, and a switch connection can be made. A transmission signal transmitted from the antenna output 5 to the HF amplifier circuit 15 is detected by the detector circuit 60, which then sets the first switch position 80 of the switch 75 for connection of the amplifier 65 and thus for transmission at the higher power stage. For reception, or in other words if the detector circuit 60 does not detect a transmission signal, the detector circuit switches the switch 75 over to the second switch position 85, so that the transmission/reception antenna 70, for receiving signals from the radio network, is connected directly to the antenna output 5 of the mobile phone 1. At program point 130, the transceiver unit 20 of the mobile phone 1 is activated by a suitable control signal of the evaluation circuit 25 for outputting signals, which contain information about operation at the power stage 4 of the mobile phone 1, for transmission by the transmission/reception antenna 70 to a base station of the radio network. A departure is then made from the program, and a speech connection can be made.

Figure 2:
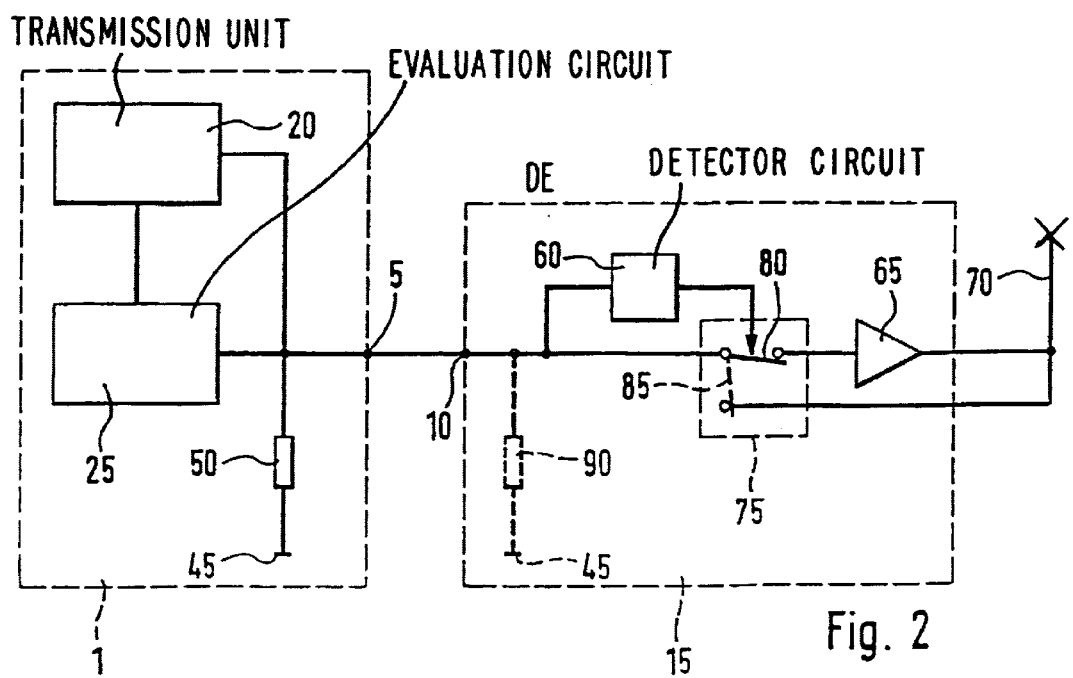
FIG. 2, a block circuit diagram of a radio apparatus of the invention with a HF amplifier circuit connected to it in a second embodiment.

In a further exemplary embodiment, shown in FIG. 2, identical elements are identified by the same reference numerals. In a distinction from the otherwise identically embodied exemplary embodiment of FIG. 1, in the exemplary embodiment of FIG. 2, the evaluation circuit 25 is again connected to the antenna output 5, and the antenna output 5 here is connected to the reference potential 45 via a third resistor 50. As indicated in dashed lines in FIG. 2, the input 10 in the HF amplifier circuit 15 can be connected to the reference potential 45 via a fourth resistor 90. In that case, one input of the mobile phone 1 is not provided, and one output of the HF amplifier circuit 15 is also not provided. The voltage drop for detecting a connected HF amplifier circuit is ascertained by the evaluation circuit 25 thus directly at the antenna output 5. The fourth resistor 90, shown in dashed lines, of the HF amplifier circuit 15 is not absolutely necessary, since the input resistance of the HF amplifier circuit 15 can be used as a measure for the gain of the amplifier 65 and thus for the power stage attained together with the mobile phone 1.

The first resistor 40 shown in FIG. 1 and the third resistor 50 shown in FIG. 2 can also be disposed inside the evaluation circuit 25 or can be formed by the appropriate internal resistance of the evaluation circuit 25 and in the exemplary embodiments described serves to illustrate the principle of detecting a connected HF amplifier circuit 15.

By means of the amplifier 65 of the HF amplifier circuit 15, the signal to be broadcast from the transmission/reception antenna 70 is amplified to the appropriate power in accordance with the higher, second power stage, while the signal to be received is sent on without impairment by the transmission/reception antenna 70 to the transceiver unit 20. In the exemplary embodiment of FIG. 2, it may be necessary to take precautions in order to keep a transmission or reception signal free of interference caused by the detection of the connected HF amplifier circuit 15, or to eliminate such interference.

The voltage source for generating the voltage drop at the input 30 in FIG. 1 or at the antenna output 5 in FIG. 2, which voltage drop is necessary for detecting a connected HF amplifier circuit 15, can be accommodated by way of example in the evaluation circuit 25, or in another way known to one skilled in the art can be connected to the input 30 or the antenna output 5 and is not shown in FIG. 1 and FIG. 2, respectively.

The radio apparatus of the invention may also be integrated with a car radio, for instance, and can be prepared for the connection of a HF amplifier circuit in accordance with the exemplary embodiments described above.

What is claimed is:

1. A radio apparatus for a mobile radio, comprising an antenna output connectable with an input of a supplementary HF amplifier circuit for operating the radio apparatus at a higher power and for extending the range of the radio apparatus, so that as a function of said HF amplifier circuit connected to the radio apparatus, the radio apparatus detects its current power stage and outputs signals for transmission to a base station, which contain information about an operation with the HF amplifier and the radio apparatus reports its current power stage to the base station, so that delay times required for synchronous data transmission can be established in accordance with the range of the radio apparatus.

2. A radio apparatus as defined in claim 1, wherein the radio apparatus is operatable at various power stages, as a function of the connection of said HF amplifier circuit.

3. A radio apparatus as defined in claim 1, and further comprising an evaluation circuit operative for detecting said HF amplifier circuit connected to the radio apparatus.

4. A radio apparatus as defined in claim 1, wherein the radio apparatus has an input to which an output of said HF amplifier circuit is connected; and further comprising an evaluation circuit connected to said input of the radio apparatus, so that the radio apparatus furnishes an information about the operation with said HF amplifier circuit as a function of signals appearing at said input of the radio apparatus.

5. A radio apparatus as defined in claim 4, wherein the radio apparatus is formed so that it furnishes the information about the operation with said HF amplifier circuit as a function of a voltage drop at said input of the radio apparatus.

6. A radio apparatus as defined in claim 4; and further comprising a reference potential; and a resistor through which said input of the radio apparatus is connected to said reference potential.

7. A radio apparatus as defined in claim 1; and further comprising an evaluation circuit coupled to said antenna output, said radio apparatus being formed so that it furnishes an information about the operation with the HF amplifier circuit as a function of signals appearing at said antenna output.

8. A radio apparatus as defined in claim 7, wherein said radio apparatus is formed so that it furnishes the information about the operation with the HF amplifier circuit as a function of a voltage drop at said antenna output.

9. A radio apparatus as defined in claim 1; and further comprising a reference potential; and a resistor through which said antenna output is connected to said reference potential.

* * * * *